United States Patent [19]
Bacon

[11] Patent Number: 5,991,100
[45] Date of Patent: Nov. 23, 1999

[54] COMPACT VIEW SCOPE

[75] Inventor: Robert E. Bacon, Coconut Creek, Fla.

[73] Assignee: Morgan Zalkin, New York, N.Y.

[21] Appl. No.: 09/243,329

[22] Filed: Feb. 3, 1999

[51] Int. Cl.$^6$ .............................. G02B 7/02; G02B 23/00
[52] U.S. Cl. ......................... 359/808; 359/367; 359/819; 40/363
[58] Field of Search ...................... 359/399, 367, 359/405–406, 409–410, 436, 894, 440–442, 467–469, 474–477, 798–812; 40/361–367

[56] References Cited

U.S. PATENT DOCUMENTS

| | | | |
|---|---|---|---|
| 271,838 | 2/1883 | Gould | 40/363 |
| 2,550,799 | 5/1951 | Fuller | 40/363 |
| 3,499,698 | 3/1970 | Malys | 359/809 |
| 3,707,052 | 12/1972 | Clark | 40/363 |
| 4,249,330 | 2/1981 | Chioffe | 40/363 |
| 4,920,672 | 5/1990 | Scott, Jr. et al. | 40/363 |
| 5,491,589 | 2/1996 | Haymond | 359/809 |

*Primary Examiner*—Thong Nguyen
*Attorney, Agent, or Firm*—Robert C. Kain, Jr.

[57] ABSTRACT

The compact view scope enables an observer to view miniaturized textual and pictorial images mounted in the scope. The compact view scope includes axially co-extensive outer and inner cylindrical bodies. The interior of the inner cylindrical body is hollow and is light transmissive. A first seal is established between the inner and outer cylindrical bodies by complementary thread members. The first axial end of the inner body defines an integral light filter end cap having at least one surface channel thereon. In a preferred embodiment, the surface channel has a U-shaped cross-section and provides a thinned end piece region which filters light therethrough. A film carrying miniaturized textual and pictorial images is disposed at the first axial end in the hollow, light transmissive interior of the inner cylindrical body adjacent the axially inboard side of the light filtering end cap. At the other, second axial end of the inner cylindrical body, a first lens chamfer is formed. The outer cylindrical body defines a lens shoulder and a second lens chamfer near the second axial end of the outer cylindrical body. A lens is mounted on the lens shoulder in the outer cylindrical body and is retained thereat by the first lens chamfer on the inner cylindrical body and the second lens chamfer formed on the inside surface of the outer cylindrical body. The lens, lens chamfers, and, in a preferred embodiment, the lens shoulder, form a second seal for the light transmissive, interior of the hollow inner cylindrical body.

14 Claims, 3 Drawing Sheets

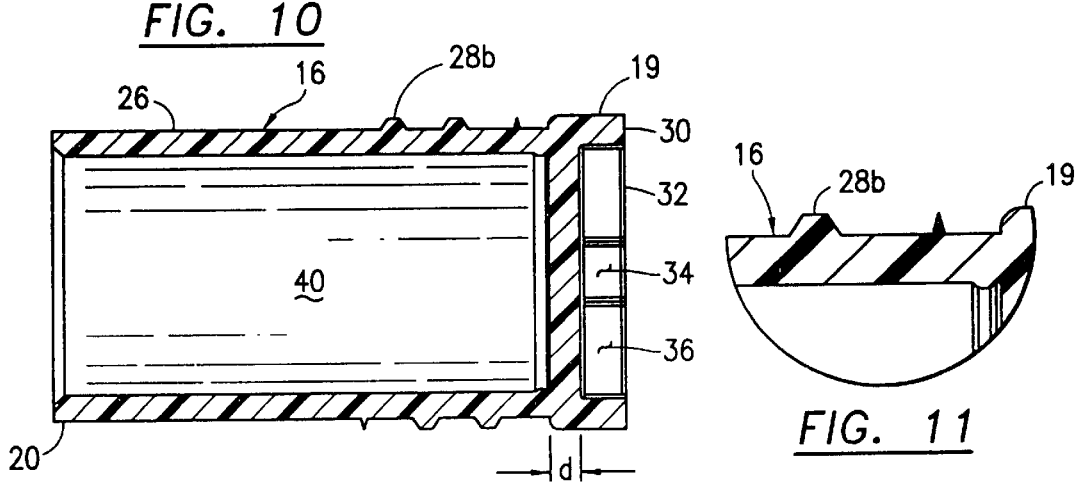
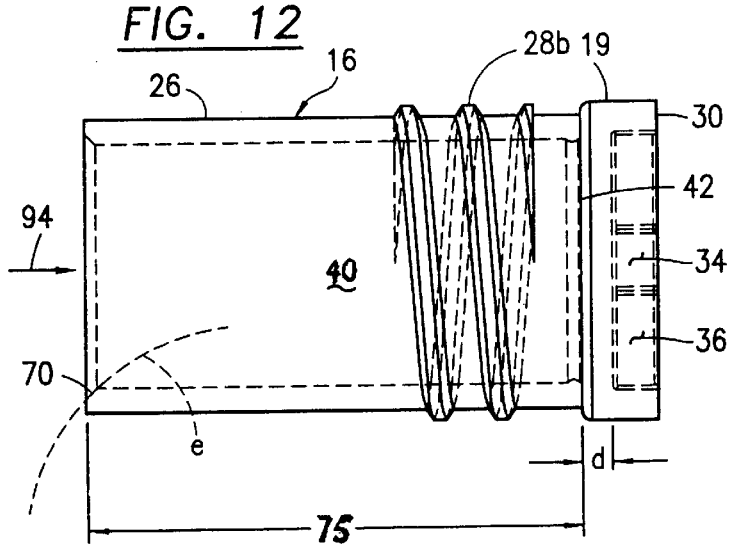
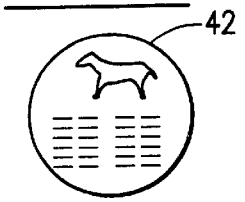
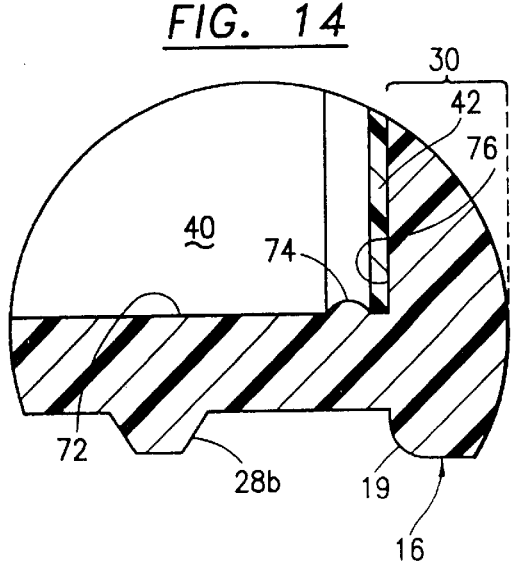

COMPACT VIEW SCOPE

The present invention relates to a compact view scope for viewing miniaturized textual and pictorial images.

BACKGROUND OF THE INVENTION

U.S. Pat. No. 4,249,330 to Chioffe discloses a medical pendant which enables an observer to view microfilm. The medical pendant has an interior, hollow chamber with the microfilm mounted at one axial end of the chamber and a magnifying lens mounted at the other axial end of the chamber. The chamber is not waterproof and the placement of the film relative to the lens varies depending upon certain manufacturing characteristics. U.S. Pat. No. 4,920,672 to Scott, Jr. et. al., discloses a medical pendant with enhanced visibility. This device enables a user to view microfilm data. The data is located in an end cap which is threadably mounted into an interior, cylindrical hollow chamber. A magnifying lens is mounted in the chamber at an opposite axial end.

Both view scopes are not waterproof and the distance between the lens and the microfilm is subject to variation due to manufacturing tolerances and errors.

OBJECTS OF THE INVENTION

It is an object of the present invention to provide a compact view scope for viewing miniaturized textual and pictorial images.

It another object of the present invention to provide a compact view scope with three seals which greatly reduce, if not eliminate, exposure of the hollow interior of the view scope with the ambient environment.

It is another object of the present invention to provide a watertight compact view scope wherein the hollow interior cavity of the inner cylindrical body of the view scope is watertight due to a triple seal system.

It is a further object of the present invention to utilize an end cap having a light filter.

It is another object of the present invention to accurately position the microfilm holding miniaturized textual and pictorial images at a fixed, predetermined position relative to the magnifying lens by locking the lens at one axial end of the inner cylindrical body of the view scope. The film is located in the same body at its other axial end.

It is an additional object of the present invention to provide a compact view scope which is less than two inches in length and one inch in cross-sectional diameter. In a working embodiment, the scope is 0.8 inches long and 0.4 inches in diameter.

SUMMARY OF THE INVENTION

The compact view scope enables an observer to view miniaturized textual and pictorial images mounted in the scope. The compact view scope includes axially co-extensive outer and inner cylindrical bodies. The inner cylindrical body is captured within the outer body. The interior of the inner cylindrical body is hollow and is light transmissive. A first seal is established between the inner and outer cylindrical bodies by complementary thread members formed on the inner surface of the outer cylindrical body and the outer surface of the inner cylindrical body. Both inner and outer cylindrical bodies have first and second axial ends. The first axial end of the inner body defines an integral light filter end cap having at least one surface channel thereon. In a preferred embodiment, the surface channel has a U-shaped cross-section and provides a thinned end piece region which filters light therethrough. A film carrying miniaturized textual and pictorial images is disposed at the first axial end in the hollow, light transmissive interior of the inner cylindrical body adjacent the axially inboard side of the light filtering end cap. At the other, second axial end of the inner cylindrical body, a first lens chamfer is formed. The outer cylindrical body defines a lens shoulder and a second lens chamfer near the second axial end of the outer cylindrical body. A lens is mounted on the lens shoulder in the outer cylindrical body and is retained thereat by the first lens chamfer on the second axial end of the inner cylindrical body and the second lens chamfer formed on the inside surface of the outer cylindrical body. The complementary thread members on the respective inner and outer surfaces of the outer and inner cylindrical bodies form a first seal for the compact view scope. The lens, lens chamfers, and, in a preferred embodiment, the lens shoulder, form a second seal for the light transmissive, interior of the hollow inner cylindrical body. A transparent end cap is captured at the second axial end of the outer cylindrical body and forms a third seal for the light transmissive, interior of the hollow inner cylindrical body. In a preferred embodiment, the first and second seals are watertight seals. The third seal may also be a watertight seal in order to hence durability of the compact view scope.

BRIEF DESCRIPTION OF THE DRAWINGS

Further objects and advantages of the present invention can be found in the written description of the preferred embodiments when taken in conjunction with the accompanying drawings in which:

FIG. 10 diagrammatically illustrates a cross-sectional view of the inner cylindrical body;

FIG. 11 diagrammatically illustrates a partial, cross-sectional view of the first axial end of the inner cylindrical body;

FIG. 12 diagrammatically illustrates a side elevational view of inner cylindrical body;

FIG. 13 diagrammatically illustrates an axial end view of the inner cylindrical body and particularly the light filtering end cap;

FIG. 14 diagrammatically illustrates a partial, cross-sectional view of the first axial end of the inner cylindrical body; and FIG. 15 diagrammatically illustrates miniaturized textual and pictorial images.

DETAILED DESCRIPTION OF THE PREFERRED EMBODIMENTS

The present invention relates to a compact view scope for viewing miniaturized textual and pictorial images. Of course, the compact view scope can be configured to permit viewing of very small size textual material rather than textual and pictorial images. As an example, one embodiment of the present invention permits viewing of data on a circular disc of film having a diameter 0.28 inches. The compact disc scope is typically no larger than 2 inches in length and 1 inch in width (the cross-sectional dimension). However, in a working embodiment, the compact view scope is approximately 0.8 inches long and 0.4 inches in diameter. The miniaturized text and pictorial images (if any) are provided on the film with a diazo process. The diazo film process enables the manufacturer to reduce the text and/or picture on the film to 22 X or as low as 32 X reduction.

Figure 1:
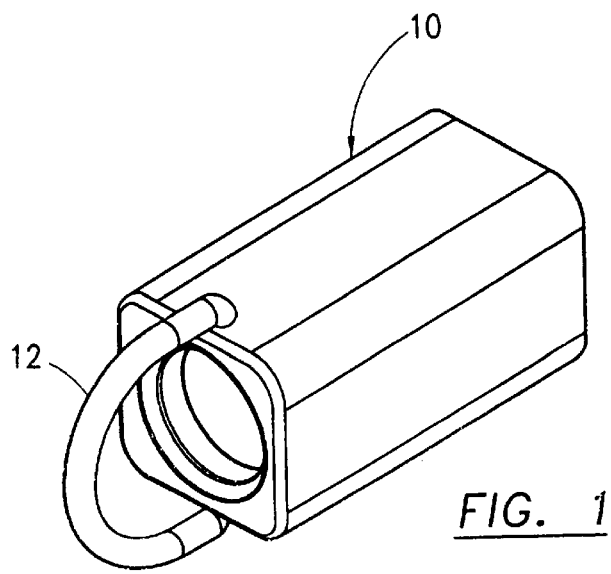
FIG. 1 diagrammatically illustrates a perspective view of the compact view scope in accordance with the principles of the present invention.

FIG. 1 diagrammatically illustrates compact view scope 10. Compact view scope 10 includes a D-ring 12 which permits the view scope to be worn on a neck chain, bracelet or other item attached to a person, object or animal. The following Utilization Table lists some information which may be carried by the film. Hence, the compact view scope can be used by people, persons or things to identify the object as well as provide critical information to the observer.

Utilization Table

Figure 2:
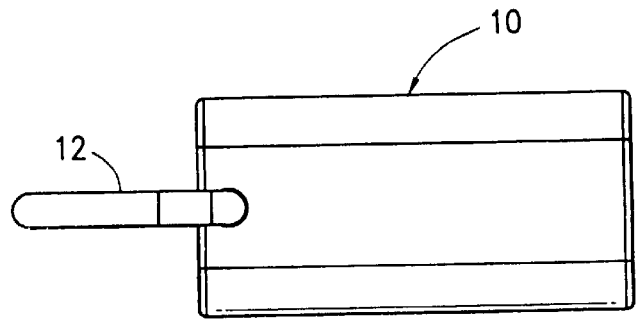
FIG. 2 diagrammatically illustrates an elevational, side view of the compact view scope.
Figure 3:
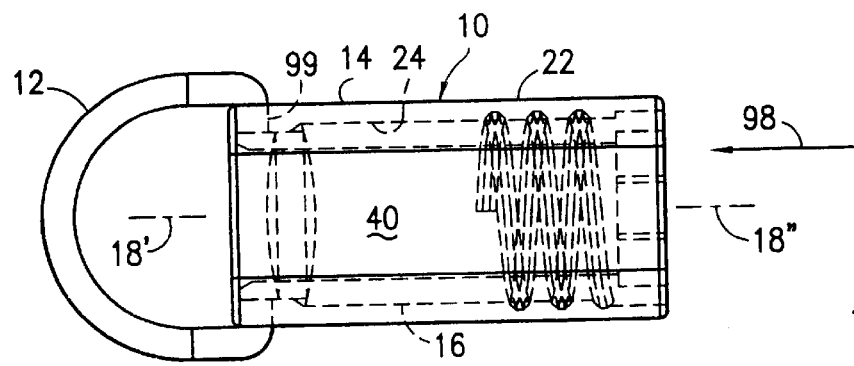
FIGS. 3 and 4 diagrammatically illustrate cross-sectional views of the compact view scope.
Figure 4:
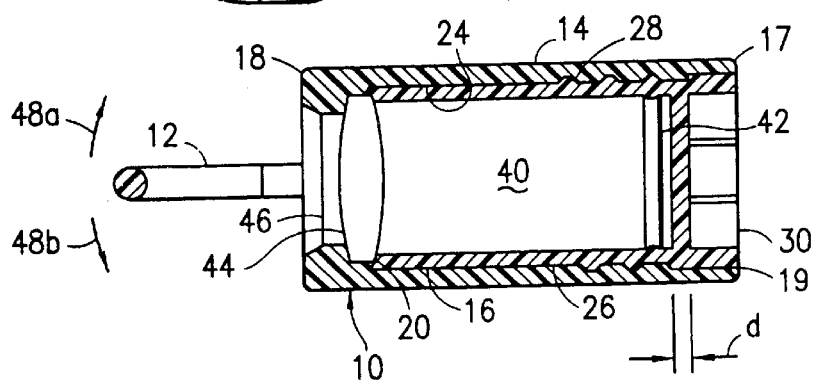

Personal identification
Medical information
Security data
Veterinary or animal identification FIG. 2 diagrammatically illustrates compact view scope 10 from a side elevational view. Similar numerals designate similar items throughout all the figures. FIG. 3 diagrammatically illustrates a side elevational view of compact view scope 10. FIG. 4 diagrammatically illustrates a cross-sectional view of the compact view scope. FIGS. 3 and 4 will be discussed concurrently therein.

Compact view scope 10 includes an outer cylindrical body 14 and an inner cylindrical body 16. Inner cylindrical body 16 is captured within outer cylindrical body 14. Bodies 14 and 16 are axially co-extensive in that they have the same axial center line 18', 18" (FIG. 3). Outer cylindrical body 14 has first and second axial ends 17, 18 and inner cylindrical body has first and second axial ends 19, 20.

The outer surface 22 of outer cylindrical body may have various shapes. The Outer Body Shape Table which follows provide some examples of the shapes.

Outer Body Shape Table

Rectilinear
Round
Elliptical
Square
Oval

Even though the outer body shape 22 of outer cylinder 14 can take on various forms, the outer cylindrical body 14 includes an inner surface 24 which is truly cylindrical (having a circular cross-sectional lateral aspect) such that the circular outer surface 26 of inner cylindrical body 16 closely matches and interfits with inner surface 24 of outer cylindrical body 14.

Inner surface 24 and outer surface 26 include a pair of complementary threads 28 which form a first seal between inner and outer cylindrical bodies 16, 14. In a preferred embodiment, complementary threads 28 are Acme stub-threads having 15 threads per inch (ANSI standard). These Acme stub-threads provide a greater thread area and the big threads permit removal of the parts from the mold. In a preferred embodiment, the compact view scope is made entirely of plastic. However, the scope can be made of other materials such as metal.

In a preferred embodiment, the axial terminal end face of first axial end 17 of outer cylindrical body 14 is longitudinally co-extensive with the axial terminal end face of first axial end 19 of inner cylindrical body 16. In contrast, the second axial end 20 of inner cylindrical 16 is not longitudinally co-extensive with axial end 18, that is, the axial terminal end face of end 20 is spaced axially or longitudinally inboard from the terminal end of axial end 18 of outer cylindrical body 14.

An end cap 30 is formed at first axial end 19 of inner cylindrical body 16. End cap 30 is integral with and is formed as a one piece body with inner cylindrical body 16. End cap 30 defines a light filtering system which, in this embodiment, includes at least one surface channel thereon. In a preferred embodiment illustrated in these figures, the light filtering end cap 30 is shown as having a cross-shaped light filter.

Figure 5:
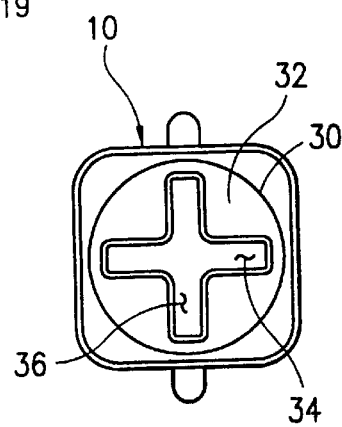
FIG. 5 diagrammatically illustrates a rear axial end view of the compact view scope.

FIG. 5 diagrammatically illustrates an axial end view of the compact view scope 10 and particularly the axial end face 32 of end cap 30. Axial end face 32 or surface 32 has a plurality of surface channels 34, 36 which form an intersecting pattern on end face 32. As shown generally in FIGS. 3 and 4, channels 34, 36 provide longitudinally (axially) thinned regions in the end cap. See dimension d in FIG. 4. This light filtering end cap permits light to enter the hollow, light transmissive interior cavity 40 of inner cylindrical body 16. As described later in the figures, a film 42 is mounted at an axially inboard position relative to end cap 30 and at the first axial end 19 of inner cylindrical body 16.

A lens 44 is mounted at the second axial end 20 of inner cylindrical body 16. A transparent end cap 46 is mounted at second axial end 18 of outer cylindrical body 14. Accordingly, a user, after rotating the ring 12 in one of the directions shown by arrows 48a, 48b, can view film 42 by placing his or her eye near transparent end cap 46. Light enters chamber 40 through the filtering end cap. Lens 44 magnifies the image and hollow, light transmissive interior cavity 40 permits the observer to view images (textual and pictorial or only textual) on film 42. Back light from the filter illuminates film 42 due to the surface channel or channels formed on axial end surface 32.

Figure 6:
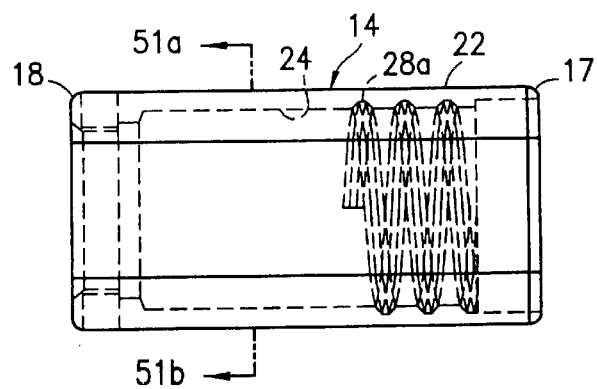
FIGS. 6 and 7 diagrammatically illustrate cross-sectional side views of the outer cylindrical body of the compact view scope.

FIG. 6 diagrammatically illustrates a side elevational view of the outer cylindrical body.

Figure 7:
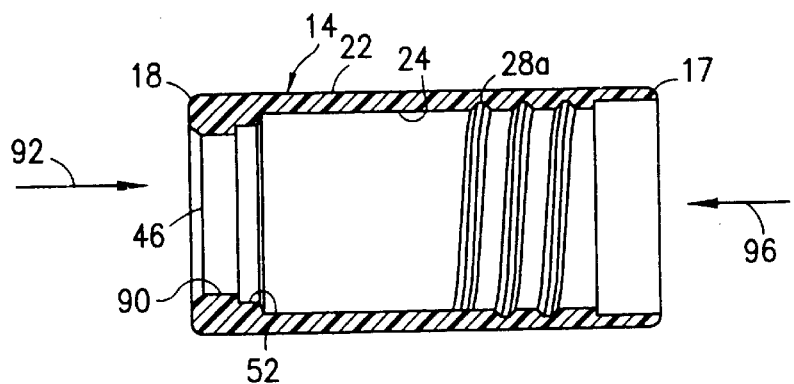

FIG. 7 diagrammatically illustrates a cross-sectional, side elevational view of the outer cylindrical body 14. Thread system 28a is clearly shown formed on the inner surface 24 of outer cylindrical body 14. As stated earlier, inner surface 24 has a circular, lateral, cross-sectional dimension from the perspective of view line 51a–51b in FIG. 6.

Figure 8:
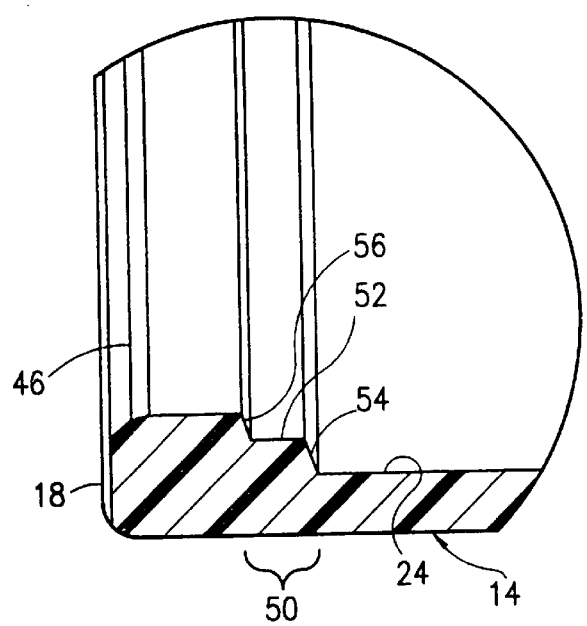
FIG. 8 diagrammatically illustrates a partial, cross-sectional view of the second axial end of the outer cylindrical body.

FIG. 8 diagrammatically illustrates a partial, cross-sectional view of second axial end 18 of outer cylindrical body 14. At an axial inboard position 50, inner surface 24 of outer cylindrical body 14 defines a lens shoulder 52. A supplemental shoulder 54 is established at an axially inboard position relative to lens shoulder 52. At an axially outboard position, a second lens chamfer 56 is formed immediately adjacent lens shoulder 52. Lens chamfer 56 matches the lens curvature at radially peripheral position 58 of lens 44 (FIG. 9) such that a seal is formed when lens 44 (FIG. 9) is disposed on lens shoulder 52. Lens shoulder 52 is sized to closely match diameter 60 of lens 44 (FIG. 9).

Figure 9:
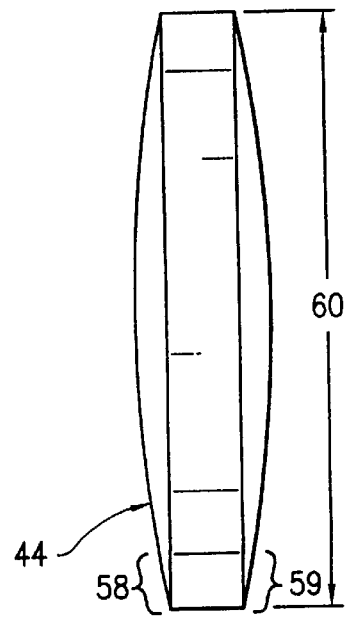
FIG. 9 diagrammatically illustrates the magnifying lens for the compact view scope.

FIG. 9 diagrammatically illustrates lens 44 used in the compact view scope.

In a preferred embodiment, lens chamfer 56 on the axial end of the outer cylinder (FIG. 8) closely matches the lens curvature in peripheral segment 58 (FIG. 9) such that a watertight seal is established in hollow interior cavity 40 of the inner cylindrical body 16 when the lens is trapped between chamfers 56, 70 (FIG. 12). Further, transparent end cap 46 is captured at the second axial end 18 of outer cylindrical body 14. Axial end cap 46 provides a third seal which also establishes watertight and sealed structure for the light transmissive, hollow interior cavity 40 of inner cylindrical body 16.

FIG. 10 diagrammatically illustrates a cross-sectional view of inner cylindrical body 16. FIG. 11 diagrammatically illustrates a partial, cross-sectional view of the first axial end of the inner cylindrical body 16. FIG. 12 diagrammatically illustrates a side elevational view of inner cylindrical body 16. FIG. 13 diagrammatically illustrates an axial end view of end cap 30 and particularly axial end surface 32. FIGS. 10–13 are discussed concurrently herein.

Outer surface 26 of inner cylindrical body 16 forms complementary threads 28b which coact with thread system 28a defined in inner surface 24 of outer cylindrical body 14 (see FIG. 6). Inner cylindrical body 16 includes a first axial end 19 which defines an integral end cap 30 thereat. End cap 30 has axially thinned regions (dimension d) created by U-shaped surface channels 34, 36. The light filters established by the surface channels can take many shapes. The following Filter Shape Table provides a list of certain light filters that can be formed on axial end surface 32 of end cap 30.

Filter Shape Table

Cross
X-Shaped
Vertical or horizontal singular channel
Multiple vertical or horizontal channels
A plurality of spaced apart cylindrical cavities Light is permitted to enter interior cavity 40 due to the axially thinned dimension d of end cap 30. The axially thinned region d can be created by cross-shaped filters, X-shaped filters, various combinations of vertical or horizontal singular channels or a plurality of spaced apart cylindrical cavities. The primary reason for U-shaped channels or a plurality of spaced apart cylindrical cavities in surface 32 is to permit the inner cylindrical body 16 to be threadably attached and screwed into outer cylindrical body 14. This threading is accomplished with the cross-shaped filters by simply inserting an appropriate tool in the channel and rotating the inner cylinder relative to the outer cylinder. With respect to multiple X-shaped, cross-shaped or singular horizontal vertical or multiple horizontal vertical channels, appropriate tools can be utilized. With respect to spaced apart cylindrical cavities, a two prong tool, shaped somewhat like a fork, could be utilized and inserted into the spaced apart cylindrical cavities (at least two cavities are required) in order to rotate inner cylindrical 16 relative to outer cylindrical body 14 thereby screwing the inner body into the outer body.

The observer or user can easily remove the cross, X, vertical or horizontal filter channel end piece by using a small screwdriver or coin. Accordingly, the user can discard the inner cylindrical body which holds film 42 (FIG. 15) and replace that inner cylindrical body with a film having updated textual or other data thereon. Accordingly, the outer cylindrical body 14 may be made of metal or a highly decorated and durable material whereas the inner cylindrical body 16 could be made of a cheaper, disposable material. If a plurality of spaced apart cylindrical cavities were utilized as a filter shape, a special tool (i.e., fork or prong tool) must be provided to the user in order to remove the inner cylindrical body 16 from outer cylindrical body 14.

In a further enhancement, the light diffusing filter 32 may be a separate item from end cap 32. In this embodiment, light diffusing filter 32 can be snapped into or inserted into an appropriate cavity in end cap 30.

Inner cylindrical body 16 includes at its second axial end 20 a first lens chamfer 70. First lens chamfer 70 is formed at an angle or a spherical dimension e which conforms to the radius of curvature of peripheral lens region 59 (FIG. 9). In this manner, when inner cylindrical body 16 is fully threaded into outer cylindrical body 14 and lens 44 is disposed on lens shoulder 52 (see FIGS. 4 and 8), first lens chamfer 70 provides a tight end (preferably a watertight seal) against axially inboard lens periphery 59 (FIG. 9). The axially outboard lens periphery 58 (FIG. 9) is captured in a tight seal (preferably a watertight seal) against second lens chamfer 56 formed on an interior surface 24 of outer cylindrical body 14 (FIG. 8). Accordingly, the thread system 28 (FIG. 4), the first and second lens chamfers 70, 56 (FIGS. 12, 8) and the transparent end cap 46 (FIG. 8) provide a triple seal system for the compact view scope.

It is an important feature of the present invention to provide a plurality of good seals for the hollow, light transmissive interior cavity 40 of the inner cylindrical body because the textual images and pictorial images on film 42 are quite small. If condensation were to accumulate in cavity 40 or if water seeped into interior cavity 40, the observer would find it difficult to view the textual and pictorial images on film 42. Also, in certain usages, the compact view scope is placed underwater. For example during a sports activity, the user may sweat or immerse the view scope temporarily in water (e.g., during a swimming activity). If the view scope is used as an identification system for pets or other animals, the pet may drool on or place the view scope in its mouth. Accordingly, a good seal for the interior cavity is necessary. The three seals provided by the thread, axially inboard and axially outboard lens chamfers and the transparent end cap provide a highly secure and controlled environment in the interior cavity.

FIG. 14 shows a partial, cross-sectional view of first axial end 19 of inner cylindrical 16. Inner cylindrical 16 includes an inner surface 72 on which is formed a small stop 74 near its axial end. A plurality of stops may be disposed about inner surface 72 or a singular, radially inwardly extending stop may be provided. Film 42 is placed adjacent axially inboard surface 76 of end cap 30. End cap 30 is generally identified in region 30 of FIG. 14. Radially inwardly extending stop 74 captures film 42 immediately adjacent end surface 76 of end cap 30.

It is another important feature of the present invention that film 42 is always placed adjacent axially inboard surface 76 of end cap 30 and lens 44 is placed at first lens chamfer 70 formed at second axial end 20 of inner cylindrical body 16. In this manner, the distance 75 (FIG. 12) between lens 44 at lens chamfer 70 and film 42 is identical, within a very small manufacturing tolerance, for each and every compact view scope. Optical adjustments are not necessary.

One of the problems with previous view scopes involved a variation in viewing distance between the lens and the film and the poor seal for the hollow, interior chamber 40. The present invention overcomes these difficulties with the three seal system and the lens and film mounting system which places the film at one axial end of inner cylindrical body 16 and the lens at the exact opposite interior axial end 20 of cylindrical body 16. Lens to film viewing distance is exclusively established by the length of the inner cylindrical chamfer.

FIG. 15 diagrammatically illustrates film 42 carrying pictorial and textual images. Of course, film 42 may only carry textual materials and images rather than pictures. However, for personal identification, specially for children, pictures may be important to link the compact view scope with the wearer of the view scope. With respect to veterinary or animal use, an image of an horse or cow may be highly desirable. However, it is not necessary that film 42 carry pictorial images.

In the present invention, a bi-spherical lens 44 (FIG. 9) is utilized to magnify the pictorial and textual images on film 42. Due to the axial spacing of lens 44 at lens chamfer 70 and the spacing of film 42 at an axial inboard end of end cap 30, it not necessary to optically adjust the distance between the lens and the film for each compact view scope. This feature is an improvement over the preexisting technology. The predetermined distance is the viewing distance between lens 44 and film 42.

Another important feature of the present invention is the radially smaller, axially outboard view area 90 intermediate lens shoulder 52, captured lens 44, and end cap 46. The radially small shoulder 90 enhances the optical view of the film from the direction shown by arrow 92 in FIG. 7. The smaller radial dimension 90 enables a better view of film 42 at the opposite axial end of compact view scope 10. This is another enhancement of the present invention over preexisting technology. The optics utilized in the present invention operate to better highlight the textual and pictorial material on film 42.

The manufacturing process for the present invention is simplified as compared with prior devices. After the inner and outer cylindrical bodies are created, film 42 is axially inserted in the inner cylinder from direction shown by arrow 94 in FIG. 12. Film 42 then is axially positioned at an axially inboard location adjacent end cap 30 by moving the film axially over radially inwardly extending bumps or stops 74 (FIG. 14). Thereafter, lens 44 is axially inserted into outer cylindrical body 14 as shown by arrow 96 in FIG. 7. Lens 44 is disposed on lens shoulder 52 and placed against axially outboard lens chamfer 56 (FIG. 8). Thereafter, inner cylinder 14 is threadably inserted into outer cylinder 14 in the direction shown by arrow 98 in FIG. 3. Inner cylinder 16 is threaded into outer cylinder 14 by an appropriate tool acting on light filtering surface channels which are illustrated in the present embodiment as surface channels 34, 36 (FIG. 5). The automatic threading is stopped when a particular torque is identified on the thread machine. At this point, lens 44 is captured between lens chamfers 56, 70 (FIGS. 4, 8 and 12) thereby providing the second seal for interior chamber 40. The first seal is provided by complementary thread 28 (FIG. 4). Lastly, the transparent end cap is mounted on cylinder 14 and the ring 12 is snapped into appropriate peripheral channels 99 (FIG. 3) formed at second axial end 18 of outer cylindrical body 14. Since lens 44 is always positioned at axial end 20 and since film 42 is always positioned at the opposite, interior axial end of interior chamber 40, no optical or mechanical adjustment is necessary to bring the textual materials and pictorial images of film 42 into focus with respect to lens 44.

The claims appended hereto are meant to cover modifications and changes within the spirit and scope of the present invention.

What is claimed is:

1. A compact view scope for viewing miniaturized textual and pictorial images comprising:

axially co-extensive outer and inner cylindrical bodies, said inner cylindrical body captured within said outer cylindrical body, an interior of said inner cylindrical body being hollow and light transmissive, said inner cylindrical body and an interior cavity defined by said outer cylindrical body having complementary cross-sections;

a first seal established between said inner and said outer cylindrical bodies by complementary thread members formed on respective inner and outer surfaces of said outer and inner cylindrical bodies;

said inner cylindrical body having a first and a second axial end, said first axial end of said inner cylindrical body forming a light filtering end cap with at least one surface channel thereon;

said inner cylindrical body capturing a film carrying said miniaturized textual and pictorial images at the first axial end of said hollow, light transmissive interior of said inner cylindrical body adjacent said light filtering end cap;

a first lens chamfer formed at said second axial end of said inner cylindrical body;

said outer cylindrical body having a first and a second axial end, said first axial end of said outer cylindrical body disposed near said first axial end of said inner cylindrical body, said second axial end of said outer cylindrical body defining a lens shoulder and a second lens chamfer axially outboard of said lens shoulder;

a lens mounted on said lens shoulder in said outer cylindrical body and retained thereat by said first lens chamfer on said second axial end of said inner cylindrical body and said second lens chamfer formed in said outer cylindrical body, said lens and lens chamfers forming a second seal for said light transmissive, interior of said hollow inner cylindrical body;

a transparent end cap captured at said second axial end of said outer cylindrical body establishing a third seal for said light transmissive, interior of said hollow inner cylindrical body.

2. A compact view scope as claimed in claim 1 wherein said first and second seals are watertight seals.

3. A compact view scope as claimed in claim 2 wherein said third seal is a watertight seal.

4. A compact view scope as claimed in claim 1 wherein said outer cylindrical body has a rectilinear outer cross-sectional shape.

5. A compact view scope as claimed in claim 1 wherein said light filtering end cap is integral with said inner cylindrical body and defines a light filter with surface channels formed in an axial terminal end face of said inner cylindrical body.

6. A compact view scope as claimed in claim 5 wherein said light filter is a pair of intersecting U-shaped surface channels.

7. A compact view scope as claimed in claim 1 wherein said film is captured in said hollow, light transmissive interior of said inner cylindrical body by a radially extending stop.

8. A compact view scope for viewing miniaturized textual and pictorial images comprising:

outer and inner cylindrical bodies having a length and a cross-sectional dimension less than two inches and one inch, respectively, said inner cylindrical body completely captured within said outer cylindrical body, an interior of said inner cylindrical body being hollow and light transmissive, said inner cylindrical body and an interior cavity defined by said outer cylindrical body having a circular cross-section;

a first seal established between said inner and said outer cylindrical bodies by complementary thread members formed on respective inner and outer surfaces of said outer and inner cylindrical bodies;

said inner cylindrical body having a first and a second axial end, said first axial end of said inner cylindrical body forming an integral end cap light filter with a plurality of surface channels thereon establishing dimensionally thinned end cap regions thereat;

said inner cylindrical body capturing a film carrying said miniaturized textual and pictorial images at the first axial end of said hollow, light transmissive interior of said inner cylindrical body adjacent said end cap light filter;

a first lens chamfer formed at said second axial end of said inner cylindrical body;

said outer cylindrical body having a first and a second axial end, said first axial end of said outer cylindrical body co-extensive with said first axial end of said inner cylindrical body, said second axial end of said outer cylindrical body defining, at an axially inboard position, a cylindrical lens shoulder and a second lens chamfer axially outboard of said lens shoulder;

a lens mounted on said lens shoulder in said outer cylindrical body and retained thereat by said first lens chamfer on said second axial end of said inner cylindrical body and said second lens chamfer formed in said outer cylindrical body, said lens, corresponding lens chamfers and lens shoulder forming a second seal for said light transmissive, interior of said hollow inner cylindrical body;

a transparent end cap captured at said second axial end of said outer cylindrical body establishing a third seal for said light transmissive, interior of said hollow inner cylindrical body.

9. A compact view scope as claimed in claim 8 wherein said first and second seals are watertight seals.

10. A compact view scope as claimed in claim 9 wherein said third seal is a watertight seal.

11. A compact view scope as claimed in claim 8 wherein said outer cylindrical body has a rectilinear outer cross-sectional shape.

12. A compact view scope as claimed in claim 8 wherein said light filter surface channels are crossing U-shaped channels.

13. A compact view scope as claimed in claim 10 wherein said outer cylindrical body has a rectilinear outer cross-sectional shape.

14. A compact view scope as claimed in claim 13 wherein said light filter surface channels are crossing U-shaped channels.

* * * * *